United States Patent

Krämer et al.

[11] Patent Number: 5,231,121
[45] Date of Patent: Jul. 27, 1993

[54] NATURAL FIBER CONTAINING MOLDING COMPOUNDS BASED ON UNSATURATED POLYESTER RESINS, AND MOLDED BODIES OBTAINED FROM THE MOLDING COMPOUNDS

[75] Inventors: Horst Krämer; Johannes Stawowy, both of Marl, Fed. Rep. of Germany

[73] Assignee: Huls Aktiengesellschaft, Marl, Fed. Rep. of Germany

[21] Appl. No.: 827,322

[22] Filed: Jan. 29, 1992

[30] Foreign Application Priority Data

Feb. 2, 1991 [DE] Fed. Rep. of Germany ....... 4103212
Sep. 20, 1991 [DE] Fed. Rep. of Germany ....... 4131337

[51] Int. Cl.⁵ .................. C08K 11/00; C08L 1/00; C08L 67/02; C08L 7/02
[52] U.S. Cl. .................. 523/509; 523/500; 523/523; 524/9; 524/13; 524/35
[58] Field of Search .............. 523/500, 509, 513, 523; 524/9, 35, 13

[56] References Cited

U.S. PATENT DOCUMENTS

| | | | |
|---|---|---|---|
| 3,616,111 | 10/1971 | Reach, Jr. | 428/53 |
| 4,129,543 | 12/1978 | Kaplan | 523/506 |
| 4,290,939 | 9/1981 | Bertsch et al. | 523/527 |
| 4,895,895 | 1/1990 | Osborne et al. | 523/527 |
| 5,075,393 | 12/1991 | Thompson | 523/527 |
| 5,077,326 | 12/1991 | Shigata et al. | 523/523 |

FOREIGN PATENT DOCUMENTS 0268722 11/1988 Japan .................. 523/500

OTHER PUBLICATIONS

Kirk-Othmer, vol. 18, pp. 575-594, "Polyesters, Unsaturated", Makhlouf.
Kirk-Othmer, vol. 5, pp. 70-88, "Cellulose", Turbak et al.

Primary Examiner—Paul R. Michl
Assistant Examiner—Peter Szekely
Attorney, Agent, or Firm—Oblon, Spivak, McClelland, Maier & Neustadt

[57] ABSTRACT

Molding compositions based on unsaturated polyester (UP) resins and containing natural fibers are prepared from which molded parts can be produced by hot pressing. The molded parts have a residual styrene content <0.1 wt. %. The UP resins are comprised of a customary UP and a mixture of styrene and di(meth)acrylic acid ester(s).

11 Claims, No Drawings

NATURAL FIBER CONTAINING MOLDING COMPOUNDS BASED ON UNSATURATED POLYESTER RESINS, AND MOLDED BODIES OBTAINED FROM THE MOLDING COMPOUNDS

BACKGROUND OF THE INVENTION

1. Field of the Invention

The present invention is directed to molding compositions and molded bodies prepared from these compositions which are used to form molded plastic parts. More particularly, the invention is directed to molding compositions containing an unsaturated polyester, a mixture of styrene and a di(meth)acrylic acid ester of a (cyclo)aliphatic diol, natural fibers and additives.

2. Discussion of the Background

Molding compositions prepared from unsaturated polyesters, styrene, natural fibers and additives and molded bodies obtained therefrom via hot pressing, i.e. molded parts comprised of natural fiber reinforced unsaturated polyester (UP) resins, have been known for a long time. For years the automobile industry has employed jute fiber reinforced molded parts comprised of UP resins combined with jute mats (with the ratio of jute to resin usually being 1:1 by weight), manufactured by hot pressing. These parts are further processed to form automobile interior surface parts. The hardened material obtained in the hot pressing process is a valuable construction material.

Natural fibers such as jute, sisal, and flax have high ability to absorb water. Therefore they must be dried before processing. After the drying there is some residual water content, the amount of which may vary. This water inhibits the radical polymerization of styrene which occurs during hot pressing. In practice, jute fiber containing molded parts have a residual styrene content of as much as 0.4–1.2 wt. %. This gives them a more or less strong odor of styrene. A number of studies have been undertaken to attempt to eliminate this disadvantage. Process modifications such as variation of the UP resins, of the polymerization initiators for the radical polymerization, and of the temperature schedule during the hot pressing and the careful drying of the jute mats, have not enabled reliable manufacture of molded parts having a residual styrene content of <0.5 wt. %.

Intensified environmental concern and the drastic reduction of the MAC (maximum allowable concentration) for styrene in 1987 from 100 pp to 20 ppm, have led to the requirement placed on molded parts manufacturers by the automobile manufacturers that the parts manufacturers produce jute reinforced molded parts having a residual styrene content of <0.1 wt. %.

Studies aimed at complete or partial replacement of the styrene in the molding compounds with diallyl phthalate have not led to the desired result. Firstly, the viscosity of the resins is too high, making it impossible to adequately impregnate the jute mats. Further, because the reaction is relatively slow, the residence times in the hot pressing process are too long. Secondly a representative resin composition of 52 parts by weight (pbw) of an unsaturated polyester, 20 pbw styrene, and 28 pbw diallyl phthalate will give a sufficiently low resin viscosity, a sufficiently short residence time in the hot pressing, good surface quality, and good mechanical strength parameters of the molded parts, as well as low (<0.1%) residual styrene content in the molded parts. However, there is a residual content of diallyl phthalate of 4–8 wt. % in the molded parts, as determined by gas chromatographic analysis. Even with the use of the best polymerization initiators, the residual monomer content is not appreciably reduced. The molded parts are unsuitable for the major intended applications, because the automotive interior surface elements produced from such parts would lead to "fogging", i.e. formation of a coating on the interior surfaces of the windowpanes of the passenger compartment.

There is a continuing need for natural fiber containing molding compounds based on UP resins, which overcome the above-described disadvantages, wherewith molded parts can reliably be obtained from the molding compounds by not pressing, which parts have a residual styrene content of <0.1 wt. %.

SUMMARY OF THE INVENTION

Accordingly, one object of the present invention is to provide a natural fiber-containing molding composition based on unsaturated polyester resins and molded parts prepared from the composition such that a residual styrene content of less than 0.1 wt. % is achieved.

This and other objects which will become apparent from the following specification have been achieved by the present composition which comprises (a) an unsaturated polyester resin, (b) a mixture of 1–85 wt. %, preferably 3 to less than 30 wt. % styrene and 99–15 wt. %, preferably 97 to greater than 70 wt. % of a di(meth)acrylic acid ester of a (cyclo)aliphatic diol, (c) natural fibers and (d) conventional additives.

DETAILED DESCRIPTION OF THE PREFERRED EMBODIMENTS

As noted above, unsaturated polyester resins suitable for use in molding compositions and molded bodies are well known in the art and have been employed for many years. Any of the UP resins which have been previously employed may be used in the present invention. See for example the polyesters described in Kirk-Othmer, "Encyclopedia of Chemical Technology", 3rd Edition, Volume 18, pages 575–594. Similarly, natural fibers such as jute, sisal and flax are well known. These and other suitable fibers are described, for example, in Kirk-Othmer, loc. cit., Volume 5, pages 70–88. Methods for preparing the unsaturated polyester resins and natural fibers for use in this invention are well known to one having ordinary skill in this art.

One essential feature of the present invention is the monomer mixture of styrene and di(meth)acrylic acid ester, including both diacrylic and dimethacrylic acid esters. A preferred diester is a dimethacrylate ester of an aliphatic diol having 2–9, preferably 3–6 carbon atoms. The diol component may contain one or more ether groups. The diol may be straight chained, branched or cyclic. Suitable diol components are, e.g., 1,4-di(hydroxymethyl)cyclohexane, diethylene glycol, tripropylene glycol and mixtures of these. Particularly preferred is 1,4-butanediol.

The monomer mixture may be prepared by conventional mixing means and contains about 1–85 wt. % styrene and 99–15 wt. % di(meth)acrylic acid ester. Preferably, the mixture contains 3 to less than 30 wt. % styrene and 97 to greater than 70 wt. % di(meth)acrylic acid ester.

The UP used is preferrably a conventional UP based on maleic anhydride, phthalic anhydride, diethylene glycol, and 1,2-propylene glycol. A solution of the UP in the inventive styrene/diester mixture, i.e. the UP resin has a low viscosity which is suitable for impregnation of the natural fibers. The content of UP in the resin (solution) is generally 40–70 wt. %, preferably 45–60 wt. %.

The impregnation of the natural fibers with the UP-styrene/diester mixture is conducted using conventional impregnation processes and equipment. Such processes and equipment are well known to those skilled in the art.

The natural fibers can be present as staple fibers, but preferably are in the form of mats. Jute mats are preferred. A typical weight ratio of jute to resin (solution) is about 1,5:1 to 1:1,5, preferably about 1,2:1 to 1:1,2, most preferably about 1:1. In individual cases the ratio may vary above and below this range as desired.

The customary additives used are, in particular, polymerization initiators for the high temperature radical polymerization (which initiators are also called "hardeners" or "curing agents"). Particularly suitable initiators are peroxides, e.g., tert-butyl perbenzoate, tert-butyl peroctoate, and myristyl percarbonate. The decomposition temperature of the hardener is selected to match the hardening temperature, i.e. temperature of the apparatus. The initiators are used in conventional amounts, generally amounts from 0.3 wt. % to about 3 wt. % based on the resin (solution). In individual cases, the amount of initiator may be varied above or below this range.

Other additives used may be fillers, such as chalk, glass fibers, and plastic fibers; and inhibitors, such as tert-butylpyrocatechol and ditert-butylcresol. The fillers and inhibitors are used in conventional amounts known in the art. Generally, the fillers are used in amounts ranging from about 1–30 wt. %, preferably about 5–25 wt. %. Obviously, amounts above or below these preferred amounts may be used to achieve a desired property such as strength, hardness, etc. Variation of the amount of filler to achieve the desired property is easily accomplished by one skilled in the art.

The invention enables one to reliably produce, by hot pressing methods, molded parts with a residual styrene content less than 0.1 wt. %, preferably less than 0.01 wt. % and residual diester content <0.05 wt. %. The molded parts have no objectionable odor. They have good surface quality and good mechanical strength parameters.

Other features of the invention will become apparent in the course of the following descriptions of exemplary embodiments which are given for illustration of the invention and are not intended to be limiting thereof.

The abbreviation "pbw" is used for "parts by weight", and "wt. %" for "weight percent". The Comparison Examples, which do not embody the invention, are designated with capital letters.

EXAMPLES

Examples A to C and 1 to 6

A UP was used which was obtained from the following monomers:

| Maleic anhydride | 3.0 mol |
| --- | --- |
| Phthalic anhydride | 1.0 mol |
| Diethylene glycol | 1.4 mol |
| 1,2-Propylene glycol | 3.0 mol |

The UP was dissolved according to the following Table 1, in styrene or a mixture of styrene and 1,4-butanediol dimethacrylate (1,4-BDDMA). The viscosity of the thus obtained UP resin (solution) was determined according to DIN 53211, namely with outflow beaker 4 at 25° C. The viscosity number given is the outflow time in seconds. 100-pbw aliquots of the UP resin (solution) were mixed with 1.0 pbw tert-butyl perbenzoate and 0.5 pbw tert-butyl peroctoate, respectively. Jute mats dried to a residual water content of <4% were impregnated with the resin (weight ratio of resin to jute 1:1) and inserted in a conventional press apparatus. Pressed plates were produced at an apparatus temperature of 135° C. and a pressing time of 55 sec (Examples A and B) or 45 sec (Examples C and 1–6). Test samples of the plates were broken into pieces with edge length <5 mm, and these pieces were immersed in acetone at room temperature for 12 hr, followed by thorough agitation while still immersed. Styrene and 1,4-BDDMA were determined in the extract, using gas chromatography. The results are given in the Table.

One can readily see that the inventive pressed plates satisfy the requirements concerning residual styrene content and the comparison pressed plates do not. The inventive plates also have very low residual diester content.

TABLE 1

Unsaturated Polyester (UP) Resins and Pressed Plates
Examples A to C and 1 to 6

|  | A | B | C | 1 | 2 | 3 | 4 | 5 | 6 |
| --- | --- | --- | --- | --- | --- | --- | --- | --- | --- |
| Styrene (pbw) | 37 | 40 | 35 | 16 | 17 | 22.5 | 30 | 30 | 33 |
| 1,4-BDDMA (pbw) | — | — | 5 (12.5)* | 20 (56)* | 15 (47)* | 10 (31)* | 10 (25)* | 15 (33)* | 10 (23)* |
| UP (pbw) | 63 | 60 | 60 | 64 | 68 | 67.5 | 60 | 55 | 57 |
| Viscosity (sec) | 45 | 35 | 40 | 205 | 286 | 207 | 53 | 28 | 34 |
| Residual styrene (%) | 0.5 | 0.7 | 0.18 | 0.05 | 0.03 | 0.07 | 0.05 | 0.04 | 0.09 |
| Residual 1,4-BDDMA (%) | — | — | <0.05 | <0.05 | <0.05 | <0.05 | <0.05 | <0.05 | <0.05 |

*Percent based on the sum of styrene and 1,4-BDDMA

Examples 7 and 8

The unsaturated polyester was dissolved in a mixture of styrene and 1,4-BDDMA according to Table 2. In other respects the method was as in Examples 1–6, above. The results are given in Table 2.

Table 2 shows that the inventive pressed plates meet the requirements for low residual styrene content very well. They also have a low residual content of diester. It is noteworthy that the UP resins did not have any odor of styrene.

TABLE 2

UP resins, and pressed plates obtained therefrom: Examples 7 and 8

|  | 7 | 8 |
| --- | --- | --- |
| Styrene (pbw) | 10 | 5 |
| 1,4-BDDMA (pbw) | 39 (80)* | 44 (90)* |
| UP (pbw) | 51 | 51 |

TABLE 2-continued

UP resins, and pressed plates obtained
therefrom: Examples 7 and 8

|  | 7 | 8 |
|---|---|---|
| Viscosity (sec) | 58 | 72 |
| Residual Styrene (%) | 0.002 | 0.002 |
| Residual 1,4-BDDMA (%) | <0.05 | <0.05 |

*Percent based on the sum of styrene and 1,4-BDDMA

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of reducing the residual styrene content to less than 0.1 wt. % and the residual di(meth)acrylic acid ester content to less than 0.05 wt. % in a molded article prepared from a molding composition containing unsaturated polyester and styrene, comprising:

preparing a formulation of unsaturated polyester, a mixture of from 1-85 wt. % styrene and 99-15 wt. % of di(meth) acrylic acid ester of a (cyclo)aliphatic diol, and optionally at least one additive selected from the group consisting of fillers and inhibitors;

impregnating a natural fiber material with said formulation;

hot pressing the combined materials which polymerizes the unsaturated components of the combined materials, thereby preparing a molded object of desired shape.

2. The method of claim 1, wherein said natural fibers are selected from the group consisting of jute, sisal and flax.

3. The method of claim 1, wherein the weight ratio of natural fiber to the weight of polyester, styrene and di(meth) acrylic acid ester is 1.5:1 to 1:1.5.

4. The method of claim 1, wherein said natural fibers comprise a jute mat.

5. The method of claim 1, wherein said mixture comprises 3 less than 30 wt. % styrene and 97 to greater than 70 wt. % of a di(meth) acrylic acid ester of a (cyclo)aliphatic diol.

6. The method of claim 1, wherein said diol contains 2-9 carbon atoms.

7. The method of claim 1, wherein said mixture comprises 3 to less than 30 wt. % styrene and 97 to greater than 70 wt. % of a dimethacrylic acid ester of an aliphatic diol having 2-9 carbon atoms.

8. The method of claim 1, where said diol is 1,4-di(hydroxymethyl)cyclohexane, diethylene glycol, tripropylene glycol, 1,4-butanediol and mixtures thereof.

9. The method of claim 1, wherein said ester is 1,4-butanediol dimethacrylate.

10. The method of claim 1, wherein said polyester comprises 40-70 wt. % of the weight of said polyester and said mixture.

11. The method of claim 1, wherein said polyester comprises 45-60 wt. % of the weight of said polyester and said mixture.

* * * * *